(No Model.)

G. H. MACKEY.
HARROW.

No. 448,446. Patented Mar. 17, 1891.

Witnesses.
W. R. Edelen,

Inventor
George H. Mackey.
By Leggett & Leggett
Attys

UNITED STATES PATENT OFFICE.

GEORGE HERBERT MACKEY, OF MILAN, ASSIGNOR OF ONE-HALF TO WILLIAM A. GALPIN, OF CLEVELAND, OHIO.

HARROW.

SPECIFICATION forming part of Letters Patent No. 448,446, dated March 17, 1891.

Application filed August 8, 1890. Serial No. 361,473. (No model.)

*To all whom it may concern:*

Be it known that I, GEORGE HERBERT MACKEY, of Milan, in the county of Erie and State of Ohio, have invented certain new and useful Improvements in Harrows; and I do hereby declare the following to be a full, clear, and exact description of the invention, such as will enable others skilled in the art to which it pertains to make and use the same.

My invention relates to improvements in harrows, the object being to provide suitable means for graduating the obliquity of the harrow-teeth and lock the parts in any desired adjustment, and also to provide suitable means whereby the teeth in meeting with obstructions—such as stones—will yield sufficiently to pass over such obstructions without snapping the teeth and without injury or jar to the other parts of the machine or to the animal.

With this object in view my invention consists in certain features of construction and in combination of parts hereinafter described, or pointed out in the claims.

Figure 1:
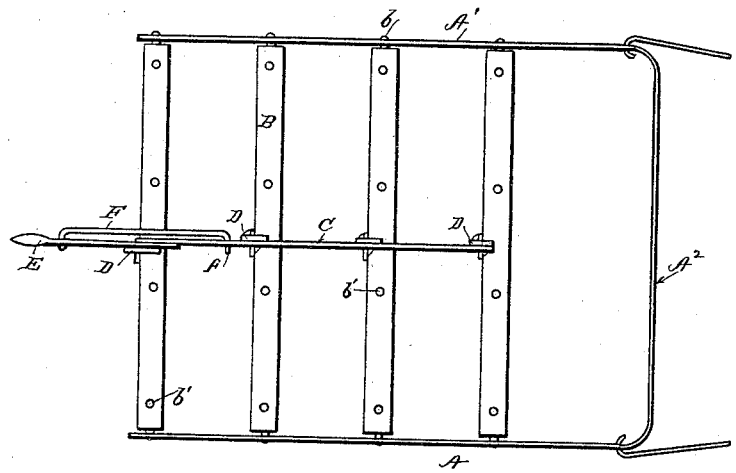
Figure 2:
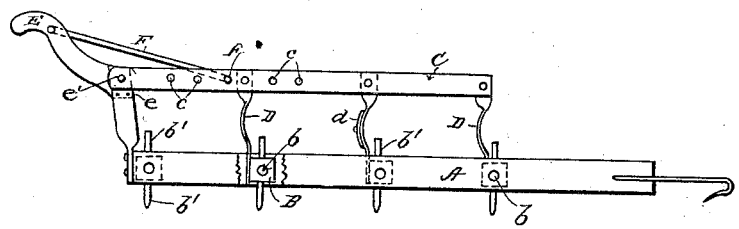
Figure 3:
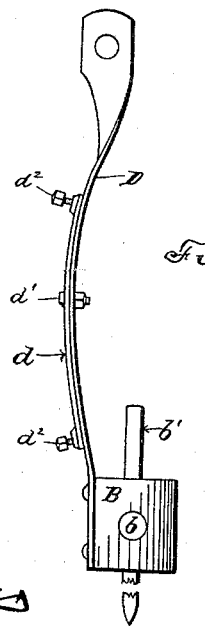

In the accompanying drawings, Figure 1 is a plan, and Fig. 2 a side elevation, of my improved harrow. Fig. 3 is a detail.

The frame of the harrow comprises side bars A A' and a front cross-bar A², the latter being integral or connected with the side bars in any suitable manner. Side bars A A' are provided with holes, respectively, for receiving gudgeons $b$ of tooth-bars B, the latter being provided with teeth $b'$.

C is a graduating-bar located, preferably, crosswise and centrally over the tooth-bars and parallel with the side bars of the frame of the machine. Graduating-bar C is connected with the respective tooth-bars by springs D, the latter being preferably flat and of the curved variety shown. In striking an obstruction springs D will yield and allow the teeth to pass over the obstruction, and hence there is no danger of snapping the teeth or in anywise jarring or injuring the machine or animal. To the graduating-bar at or near the rear end thereof is secured pivotally a hand-lever E, or connected, preferably, as shown at $e'$, this lever being rigidly secured to the rear tooth-bar, as shown at $e$, the lower portion of the lever preferably constituting substantially a spring D. Lever E has connected therewith a rod F, and the graduating-bar is provided with a series of holes $c$ or eyebolts, rod F having a hook or bent end $f$ for engaging the respective holes $c$ or eyebolts in the graduating-bar, and hence by manipulating lever E the tooth-bars and teeth may be set at any desired obliquity and locked in as many adjustments as have been provided for, according to the number of holes $c$ in the graduating-bar.

My improved harrow is simple in construction and durable, and, as has already been observed, obstructions are readily accommodated without injury or jar to the machine or animal.

In places where many obstructions are likely to be encountered I re-enforce, by means of another spring $d$, that portion of springs D where the greatest strain is brought to bear, re-enforcing springs $d$ being secured to springs D in any suitable manner, preferably by means of one or more bolts $d'$, as shown more clearly in Fig. 3, so that when not needed the re-enforcing springs may be removed.

The re-enforcing springs, as shown in Fig. 3, may also be provided with set-screws $d^2$, whereby the stiffness of the springs may be regulated to adapt them to lighter or heavier work.

What I claim is—

1. In a harrow, the combination, with tooth-bars, a graduating-bar extending transversely across the tooth-bar and having springs attached for connecting the graduating-bar with the respective tooth-bars, and a lever connected with the graduating-bar for simultaneously setting the tooth-bars and harrow-teeth at any desired obliquity, of a rod or brace connected with the lever at one end thereof and having a hook at the other end for engaging holes in the graduating-bar, whereby the parts may be locked in as many adjustments as have been provided for, according to the number of holes in the graduating-bar, substantially as and for the purpose set forth.

2. In a harrow, the combination, with tooth-bars and a graduating-bar, of springs connecting the graduating-bar with the respective tooth-bars, said springs being re-enforced where the greatest strain is brought to bear upon them and having screws to vary the stiffness of the springs, a lever connected with the graduating-bar for simultaneously setting the teeth at any desired obliquity, and suitable locking mechanism whereby the parts may be locked in any one of several predetermined adjustments, substantially as set forth.

In testimony whereof I sign this specification, in the presence of two witnesses, this 24th day of July, 1890.

GEORGE HERBERT MACKEY.

Witnesses:
   FRANK J. KELLER,
   DARWIN FAY.